T. MIURA.
AUTOMOBILE TURN TABLE.
APPLICATION FILED JULY 24, 1917.
1,253,864.
Patented Jan. 15, 1918.
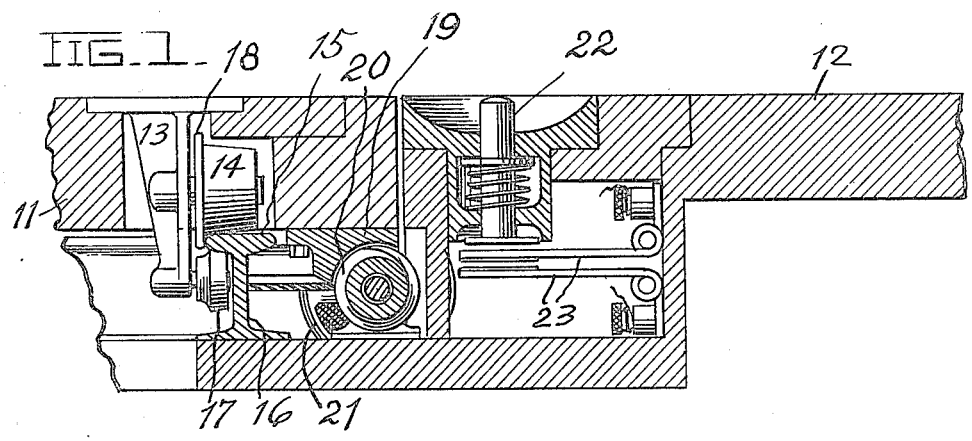
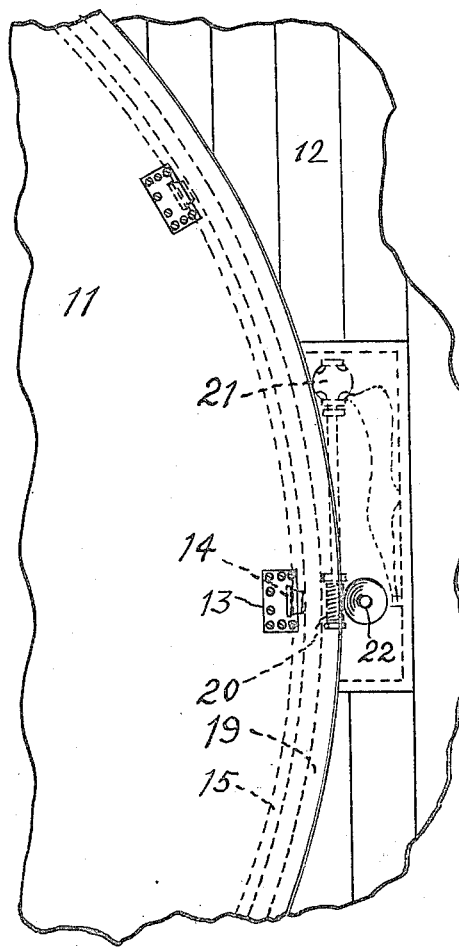
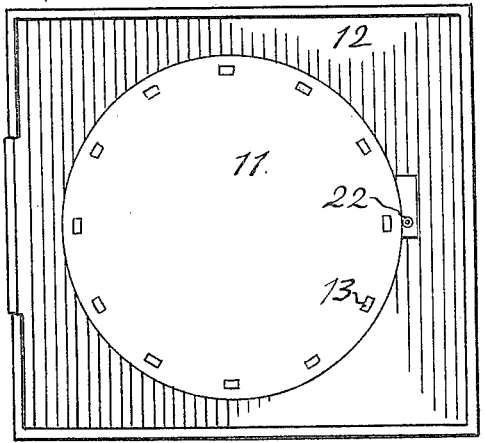
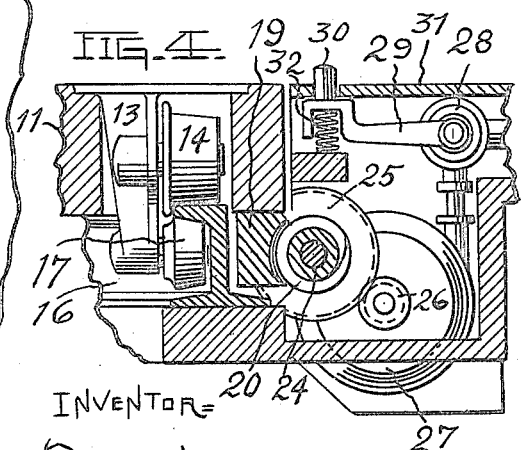
INVENTOR
Takaji Miura

UNITED STATES PATENT OFFICE.

TAKAJI MIURA, OF LOS ANGELES, CALIFORNIA.

AUTOMOBILE TURN-TABLE.

1,253,864.  Specification of Letters Patent.  Patented Jan. 15, 1918.

Application filed July 24, 1917. Serial No. 182,431.

*To all whom it may concern:*

Be it known that I, TAKAJI MIURA, a subject of the Emperor of Japan, residing at Los Angeles, in the county of Los Angeles and State of California, have invented a new and useful Automobile Turn-Table, of which the following is a specification.

The hereinafter described invention relates to a revoluble platform, adapted for turning around automobiles and motor vehicles, and to electric and pneumatic actuating means therefor, thereby enabling the operator to reverse the position of the automobile or vehicle conveniently and without working the operative parts of the vehicle.

The device consists essentially of a movable platform adapted to revolve upon a suitable circular track, and suitable power operated means for causing the movement of the platform, and a control for the power operated means whereby the platform may be manipulated as desired.

The objects of the invention are to simplify the handling of automobiles and motor vehicles in a garage or other limited space where the vehicles cannot be driven in a turning circle.

The invention embodies a novel construction and combination of parts, whereby the device may be quickly installed without requiring a special construction of the garage or building housing the automobile or motor vehicle.

In the drawings: Figure 1 is a fragmental and sectional view of a turn-table embodying my invention, showing method of applying electric power to operate the same; Fig. 2 is a reduced and fragmental plan view of the same; Fig. 3 is a plan view of a small garage with my turn-table installed therein; and Fig. 4 is a fragmental and sectional view of a turn-table arranged to be operated by compressed air.

Referring to the drawings, the turn-table consists of a circular and rotative platform 11, so mounted as to be flush with the floor 12, of the garage, and having affixed thereto a series of depending brackets 13, on which are rotatively mounted the wheels 14, adapted to engage with the top face 15, of circular track member 16, and also carrying wheels 17, which engage with the underside of the track rail. Wheels 14 are provided with flanges 18, to prevent side movement of the platform when an automobile is driven thereon, and wheels 17 are provided to prevent a possible tilting of the platform. The platform is provided with a circular rack 19, in engagement with the worm-gear 20, which is driven by an electric motor 21. A push button switch 22, is arranged in the floor 12, to close an electric circuit in which are the contact members 23, and thereby operate the motor during the time that the switch may be depressed.

In the modified form shown in Fig. 4, the worm gear shaft 24 has mounted thereon the gear wheel 25, which is driven by a pinion 26, actuated by the air motor 27. A valve 28, actuated by lever 29, controls the supply and delivery of air pressure to the air motor. A push button 30, projects from the floor 31, and may be depressed by the foot to actuate the air valve. A spring 32, normally holds the valve lever 29 in closed position.

The wheel brackets are detachable and removable from the top of the platform, so that the device may be quickly taken down for examination and repair. The platform is supported at or adjacent to the edge thereof, and therefore need not be so strongly constructed as would be the case if supported at the center, also, the depth required for installation is less. The driving apparatus, being at the side of the platform, may be installed so as to be flush with the floor, and access thereto may be quickly had.

What is claimed is:

1. In an automobile turn-table, the combination with a revoluble platform supported at the edge thereof, of a circular rack upon the edge of the platform, a motor positioned without and adjacent to the edge of the platform, gearing connecting the motor and circular rack, and lying without the platform, and a push-button control for the motor mounted in the floor at one side of and adjacent to the platform.

2. In an automobile turn-table, the combination with a revoluble platform mounted to be flush with the floor, of a driving motor connected thereto and mounted beneath the floor, and a push button control for the motor mounted in the floor at one side of the platform and adjacent thereto.

In testimony whereof I hereunto affix my signature this 12th day of July, in the year 1917.

TAKAJI MIURA.

Witnesses:
MASAYOSHI KOJIMA,
J. W. MASTER.

Copies of this patent may be obtained for five cents each, by addressing the "Commissioner of Patents, Washington, D. C."